(No Model.)
J. H. POTTER.
SPRAYING DEVICE.
No. 559,042. Patented Apr. 28, 1896.
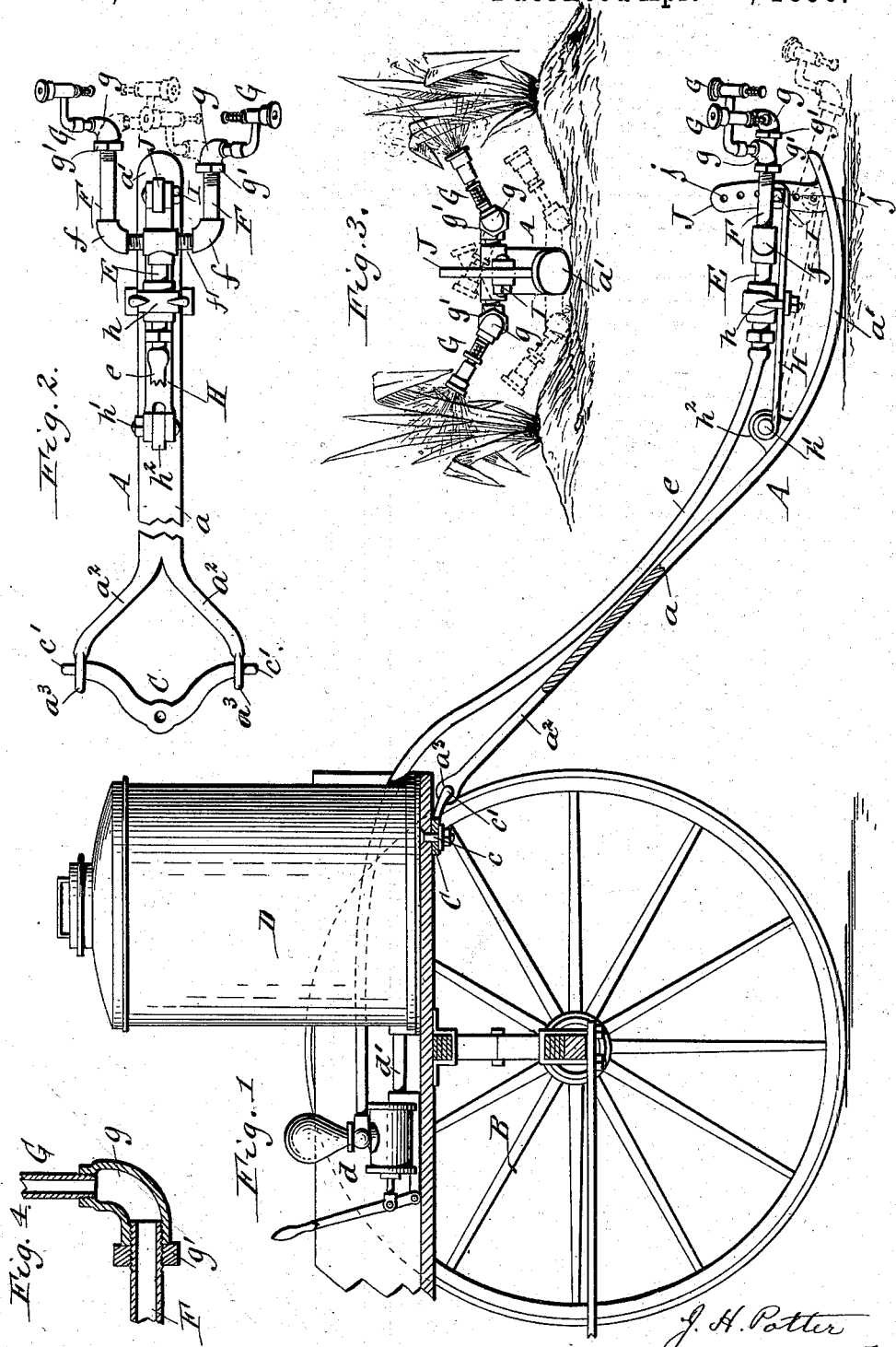
Witnesses.
Theo. L. Popp
F. Gustav Wilhelm
Inventor.
J. H. Potter
By Wilhelm & Bonner
Attorneys.
ANDREW B.GRAHAM, PHOTO-LITHO, WASHINGTON, D.C.

UNITED STATES PATENT OFFICE.

JOSEPH H. POTTER, OF BATAVIA, NEW YORK.

SPRAYING DEVICE.

SPECIFICATION forming part of Letters Patent No. 559,042, dated April 28, 1896.

Application filed October 26, 1895. Serial No. 566,994. (No model.)

*To all whom it may concern:*

Be it known that I, JOSEPH H. POTTER, a citizen of the United States, residing at Batavia, in the county of Genesee and State of New York, have invented a new and useful Improvement in Spraying Devices, of which the following is a specification.

This invention relates to a device for spraying plants with a liquid insecticide or a liquid which destroys the fungi, rust, blight, &c., whereby the plants are injured.

My invention has the object to provide a simple device for this purpose whereby an insecticide or other disinfecting liquid may be delivered against the top or the under side of the leaves of the plants in the most effective and expeditious manner.

In the accompanying drawings, Figure 1 is a fragmentary longitudinal section of my improved spraying device applied to a cart. Fig. 2 is a top plan view of the same. Fig. 3 is an end view thereof. Fig. 4 is a sectional view, on an enlarged scale, of the swivel connection between one of the branch pipes and one of the nozzles.

Like letters of reference refer to like parts in the several figures.

A represents a shoe or support on which the spraying devices are mounted and which is dragged over the surface of the ground by means of a wheeled cart B or other draft-vehicle to which it is attached. The shoe consists of an inclined bar $a$, provided at its rear lower end with a curved runner $a'$, which rests on the ground, and at its upper or front end with two forwardly-diverging arms $a^2$, each of which is provided at its front end with an eye $a^3$.

C represents a swivel-bar pivoted with its central portion by a vertical bolt $c$ to the under side of the body of the cart and provided at its ends with horizontal pins $c'$, which pass through the eyes of the arms $a^2$. As the supporting-shoe rises and falls in passing over the irregularities of the surface of the ground the shoe swings vertically on the pins of the swivel-bar, and when the cart turns horizontally in its course or the shoe strikes an obstruction which deflects the same laterally the swivel-bar turns on the vertical bolt $c$, thereby forming a universal joint or connection between the shoe and the cart.

D represents a reservoir mounted on the cart and filled with a liquid insecticide or fungus-destroying liquid of any kind suitable for the treatment of the particular insect or disease with which the plants are afflicted.

$d$ is a force-pump mounted on the cart and having its inlet connected with the lower portion of the reservoir by a pipe $d'$. This pump may be operated either by hand, as shown, or by power.

E is the main delivery-pipe, arranged over the runner of the shoe and connected with its front end by a hose $e$ with the outlet of the pump.

F represents two branch pipes arranged lengthwise on opposite sides of the shoe and pivotally connected at their front ends with the rear end of the delivery-pipe, so as to be capable of being raised and lowered at their rear ends. Each of these pivotal connections consists, preferably, of an elbow $f$, secured to the front end of the branch pipe and provided with an internal screw-thread engaging with an external thread formed on a transverse pipe $f'$, which latter is connected by a T within the main pipe.

G G represent spray-nozzles arranged on opposite sides of the shoe and each nozzle connected with the rear end of one of the branch pipes by a swiveling connection, so that the nozzle is capable of a vertical transverse swinging movement for permitting the same to be adjusted to any desired angle to suit the height and condition of the plants. This swiveling connection may be made in any suitable way, that shown in the drawings consisting of an internally-screw-threaded elbow $g$, forming the inlet of the nozzle and engaging with the externally-screw-threaded end of one of the branch pipes, and a jam-nut $g'$, arranged on the branch pipe and abutting against the elbow $g$. When it is desired to turn the nozzle, the jam-nut is loosened, which permits the nozzle to be turned freely transversely for adjusting it to any angle, after which the jam-nut is again tightened for holding the nozzle in its adjusted position.

If the rows of plants are separated a considerable distance, the nozzles are turned so as to project outwardly, as shown in full lines, Figs. 1, 2, and 3, whereby the spray is delivered as close as possible to the rows of plants on opposite sides of the path of the spraying device. If the rows of plants are arranged so close together that the nozzles cannot be projected laterally without touching or injuring the plants, the nozzles are turned inwardly, so that they cross each other, as represented in dotted lines, Figs. 2 and 3, whereby the width of the spraying device is reduced sufficently to clear the plants, and the nozzle on one side of the supporting-shoe delivers its spray against the plants on the opposite side of the supporting-shoe. In order to permit of crossing the nozzles for the purpose of clearing the plants, the nozzles are arranged transversely out of line with each other, which is readily accomplished by making one of the branch pipes longer than the other, whereby the respective nozzle is supported in a position rearward of the other nozzle, as represented in Figs. 1 and 2.

For the purpose of enabling plants of varying heights to be readily sprayed the spraying devices are made vertically adjustable on the supporting-shoe in any suitable manner, preferably by the means which are shown in the drawings and which are constructed as follows: H represents a movable arm or plate which is arranged above the supporting-shoe and to which the main delivery-pipe is secured by a clip $h$. This arm is pivoted with its front end by a transverse bolt $h'$ to a lug $h^2$ on the supporting-shoe, so that the rear end of the arm can be raised and lowered for adjusting the spraying devices. The supporting-arm is held in its adjusted position by means of a transverse bolt I, arranged in eyes formed on the rear bifurcated end of said arm and passing through one of a vertical row of openings $j$, formed in a post J, secured with its lower end to the rear portion of the runner of the shoe and arranged with its upper portion in the rear bifurcated portion of the supporting-arm. After the range of the downward adjustment of the plate H on the post J has been exhausted the nozzles can be depressed still farther for spraying the under side of the plants by turning the branch pipes on the transverse pipe until the pipes are arranged close to the ground, as represented in dotted lines, Figs. 1 and 3. By loosening the clip $h$ the main pipe may also be shifted lengthwise on the plate H for adjusting the nozzles to the plants, as represented in dotted lines, Fig. 1.

If desired, a number of these spraying devices may be arranged side by side in a gang for the purpose of spraying a number of rows of plants at one operation.

I claim as my invention—

1. The combination with the draft-gear and the shoe or support carrying the spraying devices, of a transverse swivel-bar connected at its ends by horizontal pivots with said shoe or support and a vertical pivot whereby the central portion of the swivel-bar is connected with said draft-gear, substantially as set forth.

2. The combination with the shoe or support, of two pipes mounted lengthwise side by side on said shoe or support one of said pipes projecting farther rearward than the other and two nozzles pivoted on the rear ends of said pipes so as to swing transversely and arranged transversely out of line to permit said nozzles to cross each other, substantially as set forth.

3. The combination with the shoe or support, of a supporting-arm capable of vertical adjustment on said shoe or support, a main delivery-pipe secured to said arm and provided with two branch pipes arranged lengthwise on opposite sides of said shoe or support, and nozzles pivoted transversely to said branch pipes, substantially as set forth.

Witness my hand this 21st day of October, 1895.

JOSEPH H. POTTER.

Witnesses:
ALFRED HAINES,
THEO. L. POPP.